(12) United States Patent
Williams, III et al.

(10) Patent No.: US 10,839,454 B2
(45) Date of Patent: Nov. 17, 2020

(54) SYSTEM AND PLATFORM FOR EXECUTION OF CONSOLIDATED RESOURCE-BASED ACTION

(71) Applicant: Bank of America Corporation, Charlotte, NC (US)

(72) Inventors: Ather Williams, III, Ridgewood, NJ (US); Eileen M. Holcomb, New York, NY (US); Jonathon Traer-Clark, Herfordshire (GB)

(*) Notice: Subject to any disclaimer, the term of this patent is extended or adjusted under 35 U.S.C. 154(b) by 389 days.

(21) Appl. No.: 15/920,131

(22) Filed: Mar. 13, 2018

(65) Prior Publication Data

US 2019/0287168 A1    Sep. 19, 2019

(51) Int. Cl.
*G06Q 40/02* (2012.01)
*H04L 29/06* (2006.01)
*G06N 5/02* (2006.01)
*G06F 16/2457* (2019.01)

(52) U.S. Cl.
CPC ......... *G06Q 40/02* (2013.01); *G06F 16/2457* (2019.01); *G06N 5/02* (2013.01); *H04L 63/105* (2013.01)

(58) Field of Classification Search
CPC ........ G06Q 10/00; G06Q 20/00; G06Q 30/00; G06Q 40/00
USPC ...................................................... 705/3–44
See application file for complete search history.

(56) References Cited

U.S. PATENT DOCUMENTS

| 6,999,938 | B1  |   | 2/2006  | Libman    |              |
|-----------|-----|---|---------|-----------|--------------|
| 7,707,120 | B2  | * | 4/2010  | Dominguez | G06Q 20/02   |
|           |     |   |         |           | 705/78       |
| 7,814,024 | B2  | * | 10/2010 | Ching     | G06Q 20/382  |
|           |     |   |         |           | 705/64       |
| 8,639,629 | B1  | * | 1/2014  | Hoffman   | G06Q 20/20   |
|           |     |   |         |           | 705/44       |
| 8,660,893 | B2  | * | 2/2014  | Fordyce, III | G06Q 20/12 |
|           |     |   |         |           | 705/14.3     |

(Continued)

OTHER PUBLICATIONS

Agerwala et al., "SP2 system architecture", IBM Systems Journal, vol. 38, Nos. 2 & 3 1999 (Year: 1995).*

(Continued)

*Primary Examiner* — Frantzy Poinvil
(74) *Attorney, Agent, or Firm* — Michael A. Springs; Moore & Van Allen PLLC; Nicholas C. Russell

(57) ABSTRACT

Embodiments of the present invention provide a system for execution of consolidated resource-based actions. A plurality of disparate databases may be monitored and resources from these disparate databases can be aggregated or otherwise consolidated to a consolidated resource database. A request can be received from a computing device of the user, where the request includes request parameters that provide structure and specificity to the request. Relevant data is identified from the plurality of disparate databases and/or from the consolidated resource database. A determination is made for a response action based on the relevant data and the request parameters, where such a determination can be made through the assistance of artificial intelligence or machine learning engines. Finally, the responsive action is executed, which involves at least causing a user interface of the computing device of the user to communicate a response to the received request.

20 Claims, 9 Drawing Sheets

(56) References Cited

U.S. PATENT DOCUMENTS

| | | | |
|---|---|---|---|
| 8,738,418 B2* | 5/2014 | Winters | G06Q 20/387 705/7.29 |
| 10,002,177 B1 | 6/2018 | McClintock et al. | |
| 2002/0169595 A1 | 11/2002 | Agichtein et al. | |
| 2003/0141360 A1 | 7/2003 | De Leo et al. | |
| 2003/0217005 A1 | 11/2003 | Drummond et al. | |
| 2009/0159661 A1 | 6/2009 | Sanches | |
| 2010/0191686 A1 | 7/2010 | Wang et al. | |
| 2011/0264497 A1* | 10/2011 | Clyne | G06O 30/0215 705/14.17 |
| 2011/0264567 A1* | 10/2011 | Clyne | G06Q 40/12 705/30 |
| 2012/0253852 A1* | 10/2012 | Pourfallah | G06Q 20/3276 705/4 |
| 2012/0303425 A1* | 11/2012 | Katzin | G06Q 20/027 705/14.4 |
| 2013/0035931 A1 | 2/2013 | Ferrucci et al. | |
| 2013/0159404 A1 | 6/2013 | Pfaff | |
| 2013/0166332 A1* | 6/2013 | Hammad | G06Q 20/32 705/5 |
| 2014/0019352 A1 | 1/2014 | Shrivastava | |
| 2014/0040134 A1* | 2/2014 | Ciurea | G06Q 20/383 705/44 |
| 2014/0136381 A1 | 5/2014 | Joseph et al. | |
| 2014/0244353 A1* | 8/2014 | Winters | G06Q 30/0201 705/7.29 |
| 2015/0073989 A1* | 3/2015 | Green | G06Q 20/382 705/44 |
| 2015/0081531 A1 | 3/2015 | Caldwell | |
| 2016/0171542 A1* | 6/2016 | Fanous | G06Q 30/0256 705/14.54 |
| 2016/0307117 A1 | 10/2016 | Yang et al. | |
| 2016/0335723 A1 | 11/2016 | Spottswood | |
| 2017/0039134 A1 | 2/2017 | Moore, Jr. et al. | |
| 2017/0039475 A1 | 2/2017 | Cheyer et al. | |
| 2017/0149973 A1 | 5/2017 | Griesmer et al. | |
| 2017/0301015 A1 | 10/2017 | Tunnell | |
| 2017/0301190 A1 | 10/2017 | Brancaccio | |
| 2017/0352223 A1 | 12/2017 | Brancaccio | |

OTHER PUBLICATIONS

Chopporian et al., "Mind your business by mining your data", S.A.M. Advanced Management Journal, 66, 2; Proquest Central p. 45. (Year: 2001).*

Ed McCarthy, "Augmented Intelligence"; Combining Human Intelligence and Technology, Oct. 18, 2017, retrieved from the internet at https://blogs.cfainstitute.org/investor/2017/10/18/augmented-intelligence-combining-human-intelligence-and-technology/, 6 pages.

Natalia Wojcik, Pefin, a fintech start-up, is using A.I. to offer financial advice. Just don't call it a 'robo advisor.'; Sep. 9, 2017; retrieved from the Internet at https://www.cnbc.com/2017/09/08/fintech-start-up-pefin-uses-a-i-to-offer-financial-advice.html, 6-pages.

EuroFinance; The 7 signs of intelligent treasure; retrieved from the Internet on Jul. 17, 2018 from https://www.eurofinance.com/news/2017/05/25/7-signs-intelligent-treasury, 5 pages.

https://www.pefin.com/ retrieved from the internet on Jul. 17, 2018, 7 pages.

Dejan Knezevic et al, CAPCO, Transformative Nature of Artificial Intelligence (AI) in Wealth Management; retrieved on Jul. 17, 2018 from the Waybackmachine internet archive at https://web.archive.org/web/20171031121115/https://www.capco.com/insights/capco-thoughts/~/media/Capco/Insights/ThoughtLeadership/transformative-nature-of-artificial-intelligence-in-wealth-management.pdf, 14 pages.

* cited by examiner

SYSTEM AND PLATFORM FOR EXECUTION OF CONSOLIDATED RESOURCE-BASED ACTION

BACKGROUND

Providing users with responses to a varied and wide ranging set of requests requires a large amount of processing requirements, specialist time, and the like. Bringing together disparate data sources and systems into a cohesive platform for responding to specific requests from computing devices of users improves the amount of information available to such users and significantly decreases the burdens of time, resources, and specialist interactions by a managing entity in providing such responses.

BRIEF SUMMARY

The following presents a summary of certain embodiments of the invention. This summary is not intended to identify key or critical elements of all embodiments nor delineate the scope of any or all embodiments. Its sole purpose is to present certain concepts and elements of one or more embodiments in a summary form as a prelude to the more detailed description that follows.

Embodiments of the present invention address the above needs and/or achieve other advantages by providing apparatuses (e.g., a system, computer program product and/or other devices) and methods for execution of consolidated resource-based actions. The system embodiments may comprise one or more memory devices having computer readable program code stored thereon, a communication device, and one or more processing devices operatively coupled to the one or more memory devices, wherein the one or more processing devices are configured to execute the computer readable program code to carry out the invention. In computer program product embodiments of the invention, the computer program product comprises at least one non-transitory computer readable medium comprising computer readable instructions for carrying out the invention. Computer implemented method embodiments of the invention may comprise providing a computing system comprising a computer processing device and a non-transitory computer readable medium, where the computer readable medium comprises configured computer program instruction code, such that when said instruction code is operated by said computer processing device, said computer processing device performs certain operations to carry out the invention.

For sample, illustrative purposes, system environments will be summarized. The system may involve monitoring a plurality of disparate databases, receiving a request from a computing device of a user, wherein the received request comprises request parameters, and identifying relevant data from the plurality of disparate databases based on the request parameters. The system may then determine a responsive action based on the relevant data and the request parameters. In response to determining the responsive action, the system may execute the responsive action, wherein executing the responsive action comprises at least causing a user interface of the computing device of the user to communicate a response to the received request.

In some embodiments, monitoring the plurality of disparate databases may comprise continuously monitoring a plurality of databases associated with a plurality of disparate systems of record.

The system may, in some embodiments, aggregate data from the plurality of disparate databases into a consolidated resource database and identify the relevant data from the consolidated resource database based on the request parameters.

Furthermore, the system may additionally provide an online portal to the computing device of the user. Next, the system may receive the request from the computing device of the user via the online portal. The system can then cause the user interface of the computing device of the user to communicate the response to the received request via the online portal.

In some embodiments, determining the responsive action based on the relevant data and the request parameters further comprises transmitting the relevant data and the request parameters to an artificial intelligence engine configured to determine responsive actions, and receiving an output of the responsive action from the artificial intelligence engine.

The received request may comprise a command to adjust an authorization level of an individual to interact with a financial account associated with the user. In such embodiments, executing the responsive action may comprise adjusting the authorization level of the individual to interact with the financial account associated with the user and transmitting a notification message confirming the adjusting to the computing device of the user.

Similarly, the received request comprises a command to provide a model of a future financial status of an entity associated with the user. In such embodiments, determining the responsive action based on the relevant data and the parameters may comprise generating the model of the future financial status of the entity. Furthermore, executing the responsive action may further comprise displaying the model of the future financial status of the entity on the computing device of the user along with one or more adjustable variables that are configured to adjust one or more inputs to the model of the future financial status of the entity.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
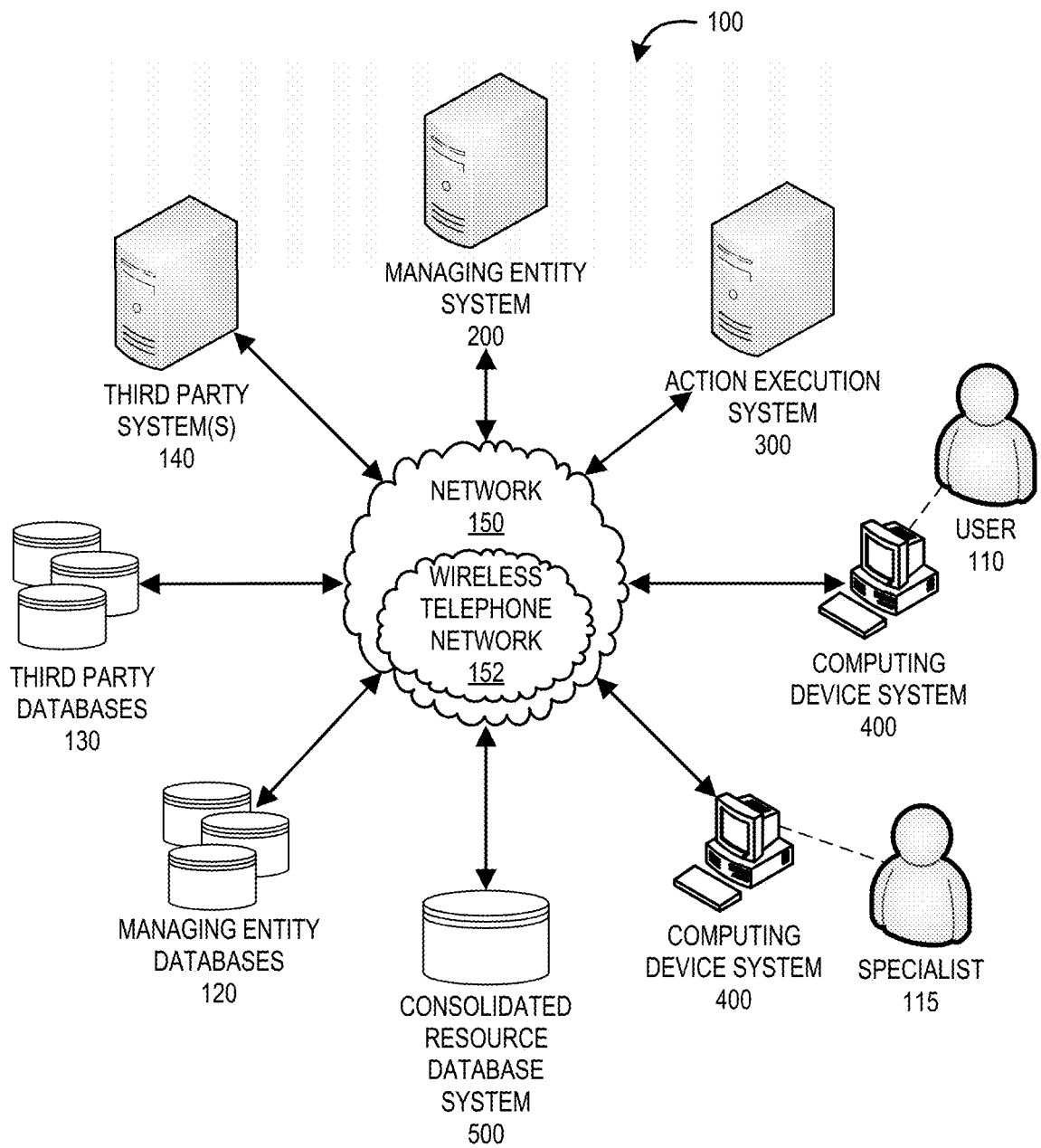
Figure 2:
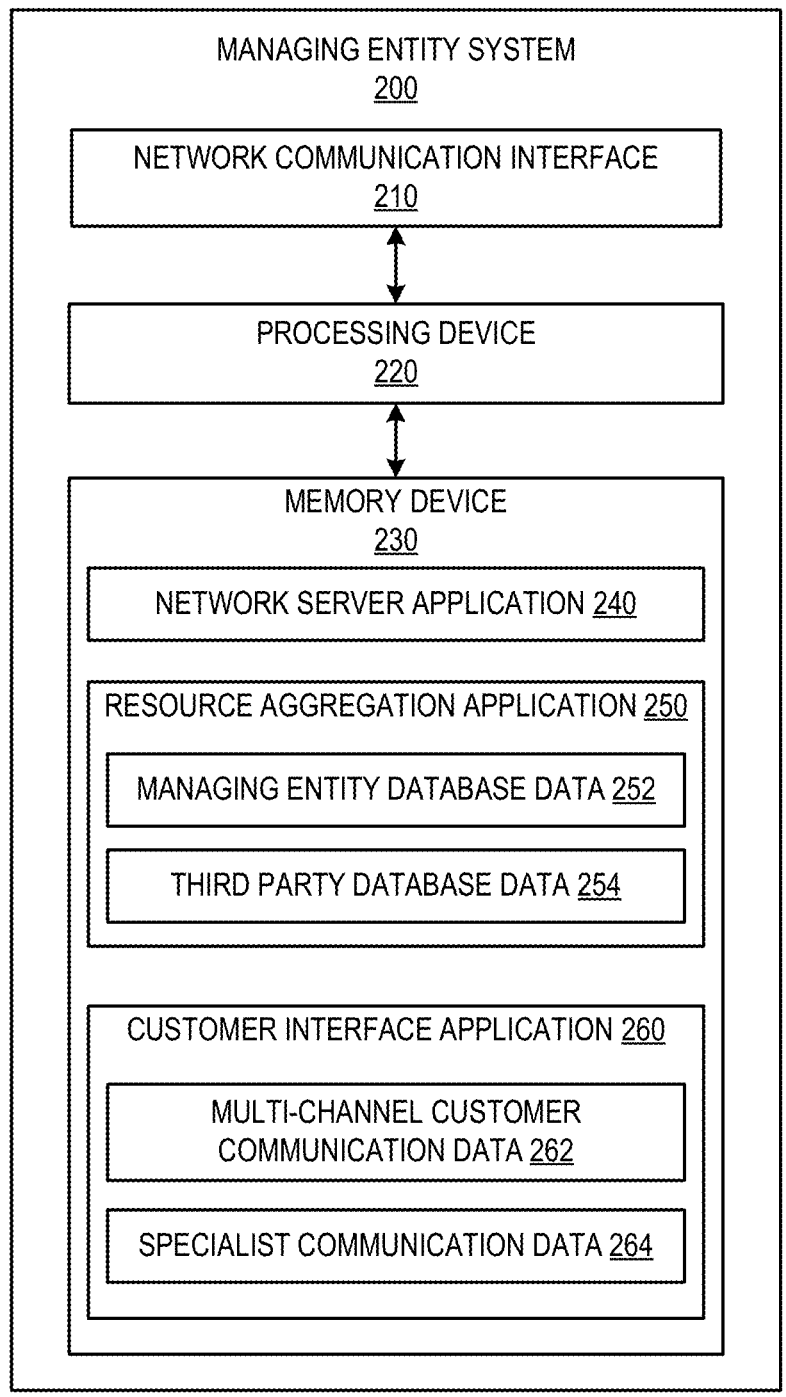
Figure 3:
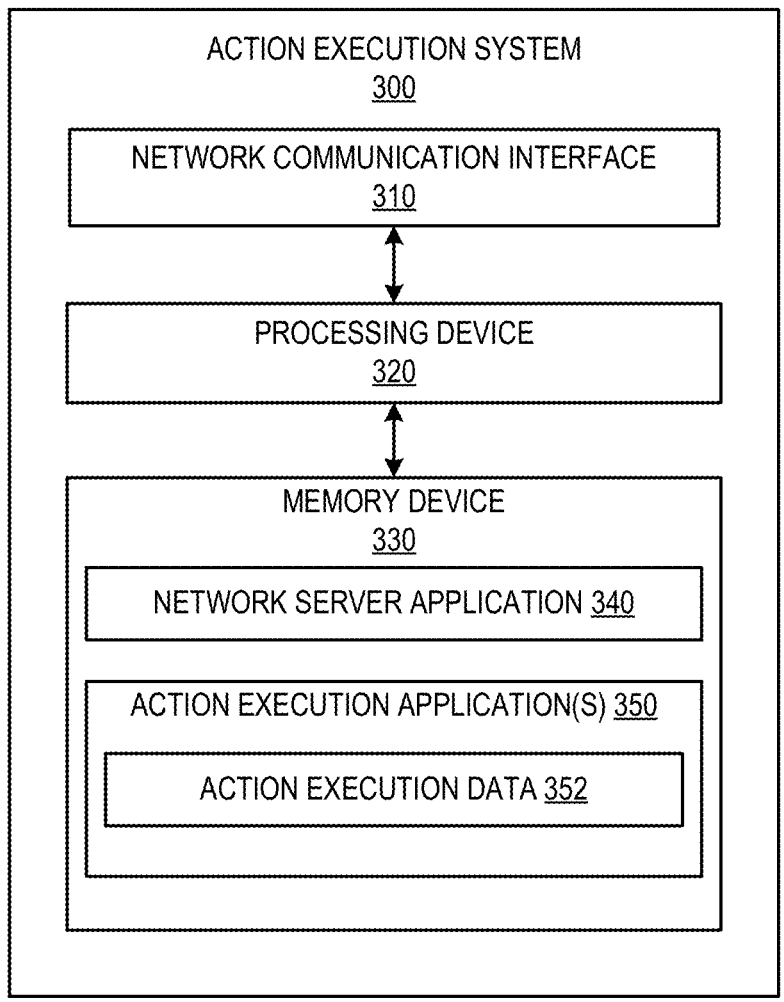
Figure 4:
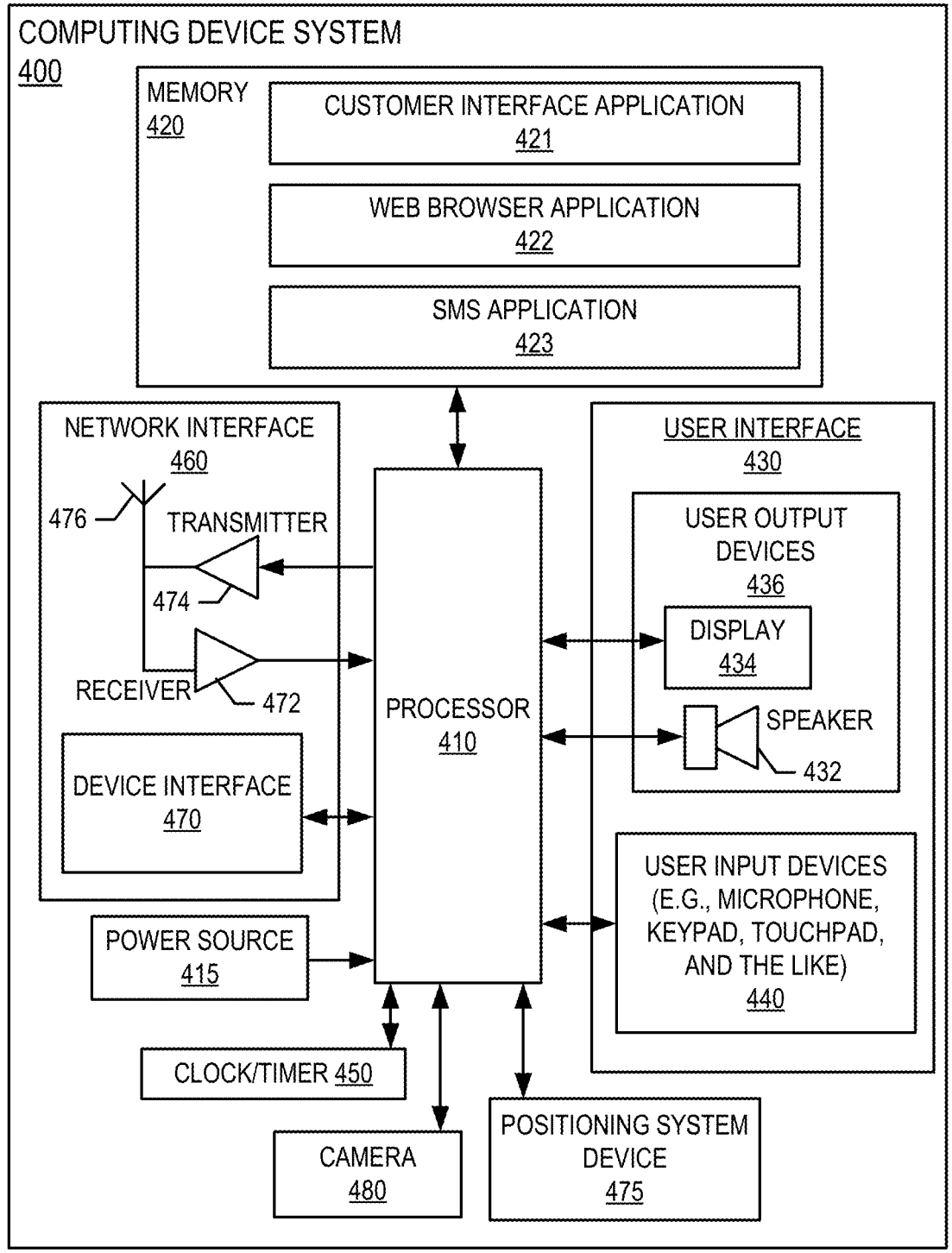
Figure 5:
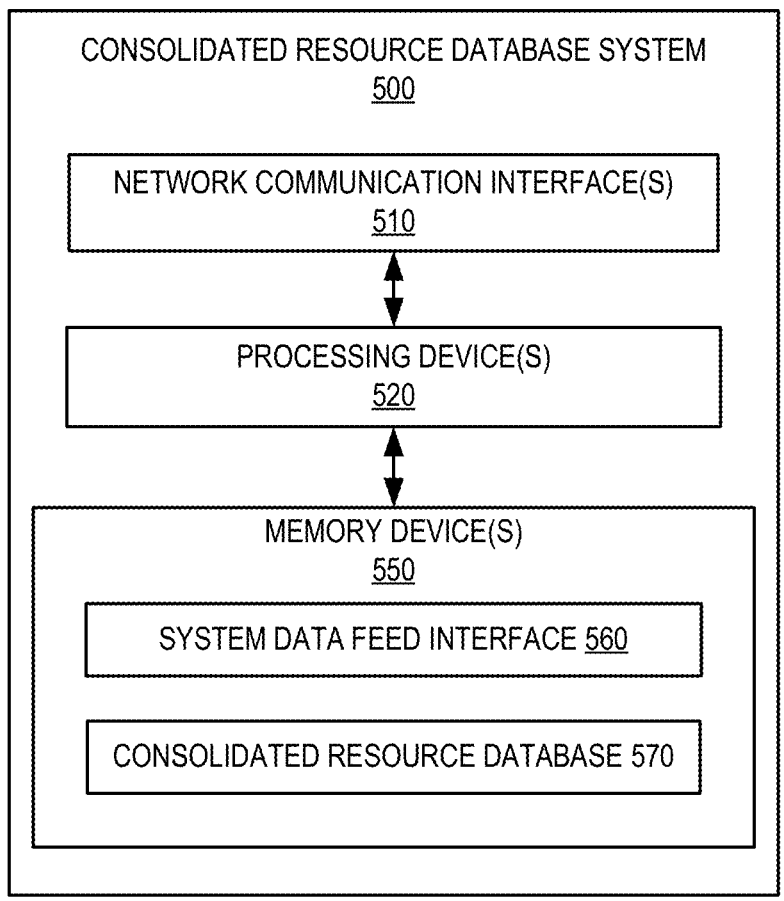
Figure 6:
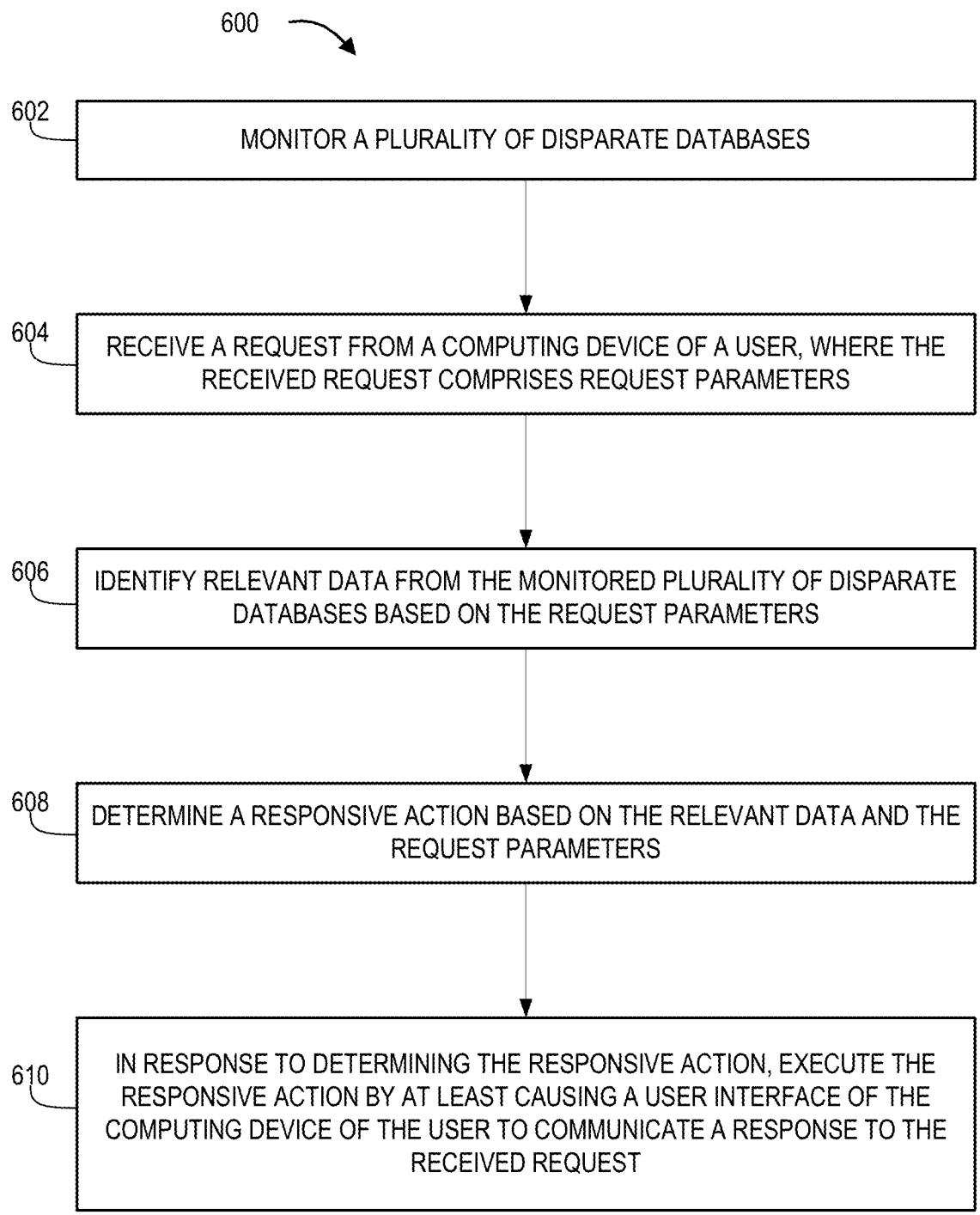
Figure 7A:
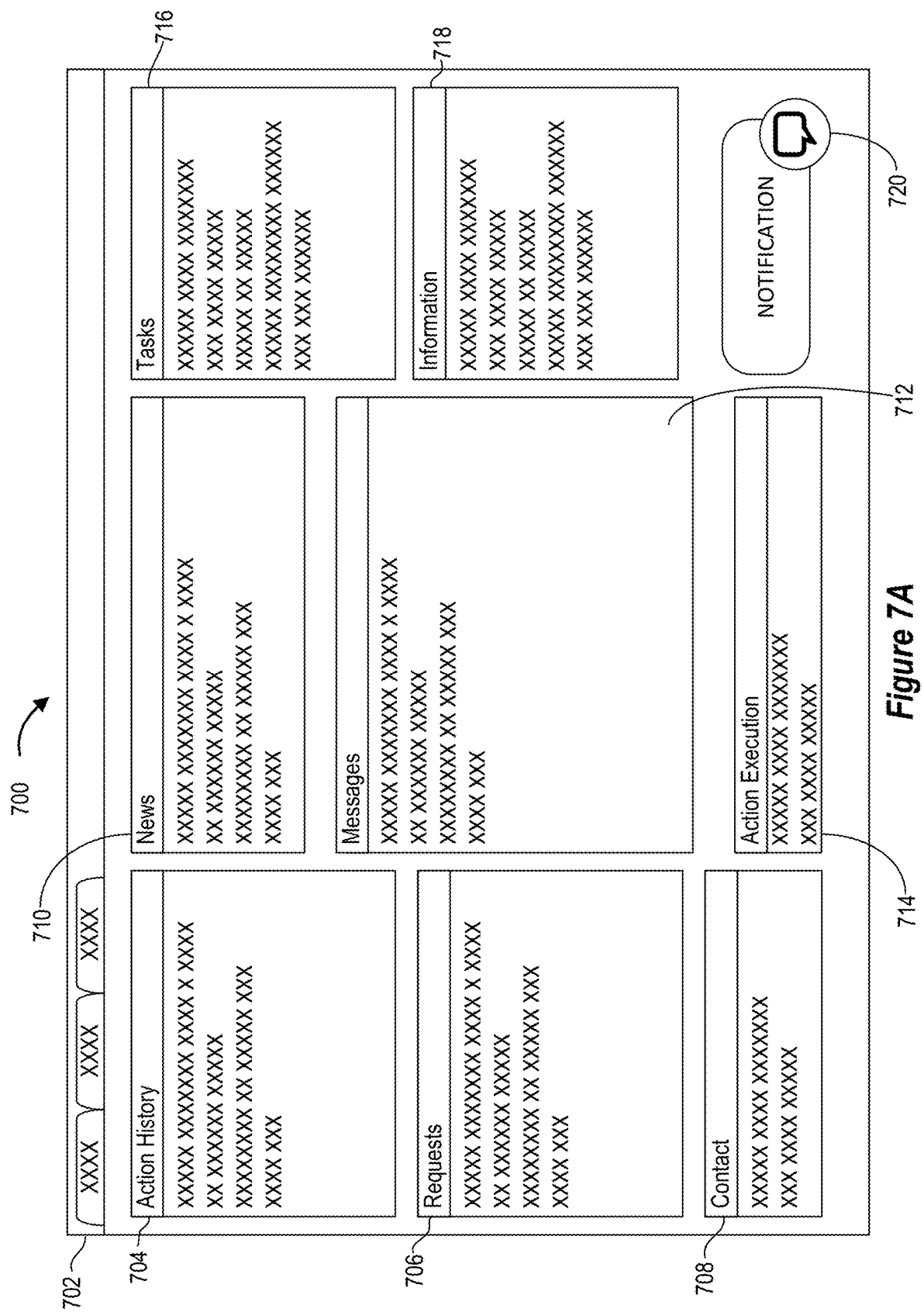
Figure 7B:
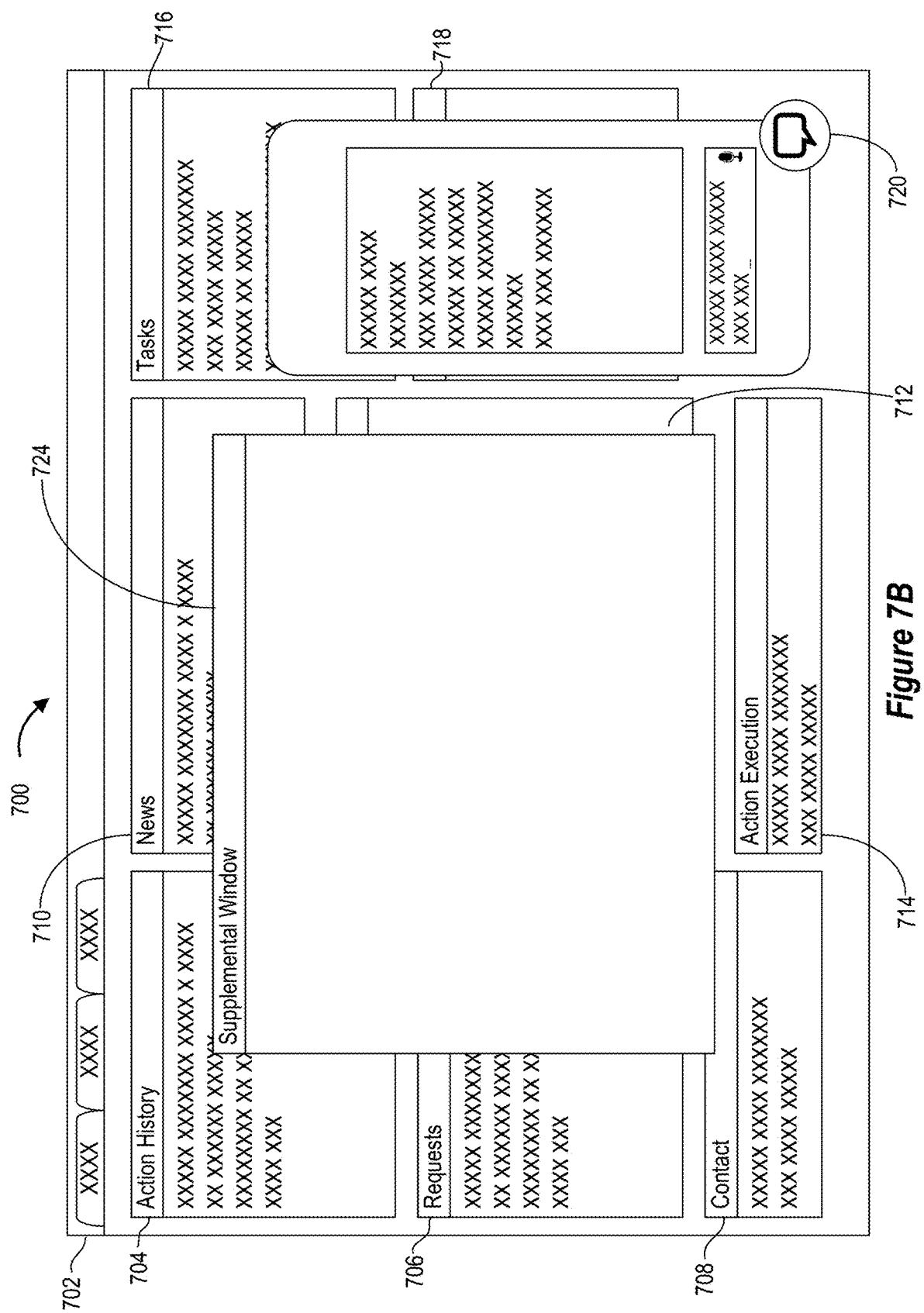
Figure 8:
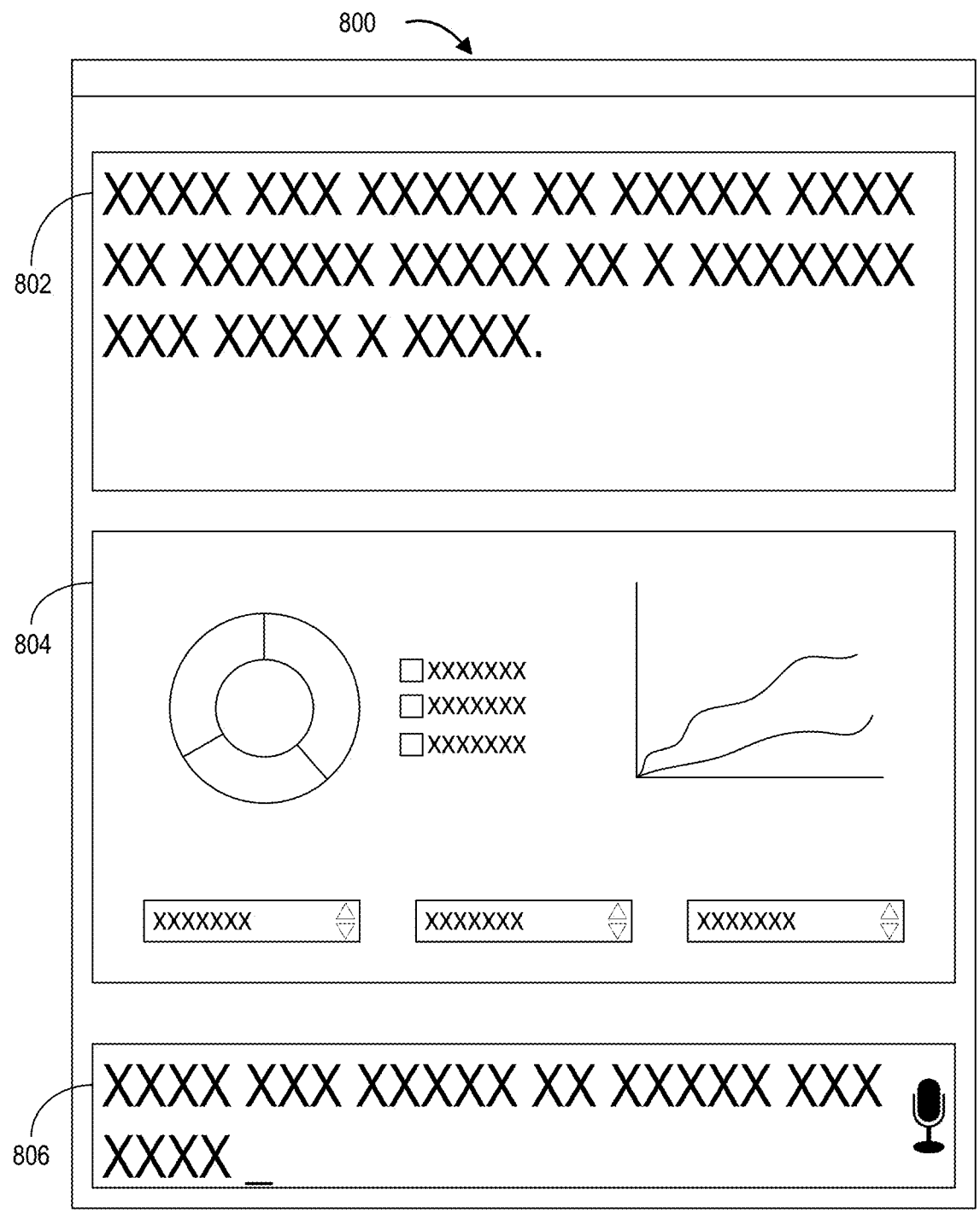

Having thus described embodiments of the invention in general terms, reference will now be made the accompanying drawings, wherein:

FIG. 1 provides a block diagram illustrating a system environment for execution of consolidated resource-based actions, in accordance with an embodiment of the invention;

FIG. 2 provides a block diagram illustrating the managing entity system of FIG. 1, in accordance with an embodiment of the invention;

FIG. 3 provides a block diagram illustrating the action execution system of FIG. 1, in accordance with an embodiment of the invention;

FIG. 4 provides a block diagram illustrating the computing device system of FIG. 1, in accordance with an embodiment of the invention;

FIG. 5 provides a block diagram illustrating the consolidated resource database of FIG. 1, in accordance with an embodiment of the invention;

FIG. 6 provides a flowchart illustrating a process for execution of consolidated resource-based actions, in accordance with embodiments of the invention;

FIGS. 7A and 7B provide sample computing device user interface displays that may be provided as part of a system for execution of consolidated resource-based actions, in accordance with an embodiment of the invention; and FIG. 8 provides a sample mobile computing device display that may be provided as part of a system for execution of consolidated resource-based actions, in accordance with an embodiment of the invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

Embodiments of the present invention provide a system and method for execution of consolidated resource-based actions. A plurality of disparate databases may be monitored and resources from these disparate databases can be aggregated or otherwise consolidated to a consolidated resource database. A request can be received from a computing device of the user, where the request includes request parameters that provide structure and specificity to the request. Relevant data is identified from the plurality of disparate databases and/or from the consolidated resource database. A determination is made for a response action based on the relevant data and the request parameters, where such a determination can be made through the assistance of artificial intelligence or machine learning engines. Finally, the responsive action is executed, which involves at least causing a user interface of the computing device of the user to communicate a response to the received request.

FIG. 1 provides a block diagram illustrating a system environment 100 for execution of consolidated resource-based actions, in accordance with an embodiment of the invention. As illustrated in FIG. 1, the environment 100 includes a managing entity system 200, an action execution system 300, one or more computing device systems 400, a consolidated resource database system 500, managing entity databases 120, third party databases 130, and one or more third party systems 140. One or more users 110 and/or specialists 115 may be included in the system environment 100. In some embodiments, a user 110 of the system environment 100 may be a customer of a managing entity (e.g., the entity that owns, maintains, or otherwise controls the managing entity system 200). For example, the user 110 may be a treasurer, financial executive, corporate executive, financial employee, mergers and acquisitions employee, or the like of an organization or institution that is a customer of the managing entity. In some embodiments the user 110 may be a personal customer of the managing entity. The specialist 115 may be an employee, consultant, third party representative, or the like of the managing entity. The specialist 115 may have expertise and/or training in one or more financial products and/or services associated with the managing entity and/or the organization or institution associated with the user 110. Both the user 110 and the specialist 115 may own, use, have permission to use, or otherwise have access to one or more computing device systems 400.

The managing entity system 200, the action execution system 300, the computing device system(s) 400, the consolidated resource database system 500, and/or the third party system(s) 140 may be in network communication across the system environment 100 through the network 150. The network 150 may include a local area network (LAN), a wide area network (WAN), and/or a global area network (GAN). The network 150 may provide for wireline, wireless, or a combination of wireline and wireless communication between devices in the network. In one embodiment, the network 150 includes the Internet. The network 150 may comprise a wireless telephone network 152.

The managing entity system 200 may be a system owned or otherwise controlled by a managing entity to perform one or more process steps described herein. In some embodiments, the managing entity is a financial institution. For example, the managing entity may provide products, services, advice, modeling, and other actions to customer organizations (e.g., to treasury offices of customer organizations). In general, the managing entity system 200 is configured to communicate information or instructions with the action execution system 300, the one or more computing device systems 400, the consolidated resource database system 500, the managing entity databases 120, the third party databases 130, and/or the third party system 140 across the network 150.

For example, the managing entity system 200 may access and monitor the managing entity databases 120, access and monitor the third party databases 130, and consolidate, aggregate, or otherwise add data identified from the managing entity databases 120 and/or the third party databases 130 into the consolidated resource database system 500. Additionally or alternatively, the managing entity system 200 may be configured to cause the computing device system 400 of the user 110 and/or the specialist 115 to display an online or mobile device portal application on a user interface of the computing device system 400. The managing entity system 200 may then be configured to receive user input from the computing device system(s) 400 and communicate the user input to the action execution system 300, the consolidated resource database system 500, and/or a third party system 140. The managing entity system 200 may also be configured to receive responsive actions, or instructions for executing responsive actions, from the action execution system 300, the consolidated resource database system 500 and/or a third party system 140, and the managing entity system 200 may perform the execution of the responsive action and/or communicate the responsive action to the computing device(s) of the user and/or the specialist 115. Of course, the managing entity system 200 may be configured to perform (or instruct other systems to perform) one or more other process steps described herein. The managing entity system 200 is described in more detail with respect to FIG. 2.

The action execution system 300 may be a system owned or controlled by the managing entity and/or a third party that specializes in customer interfacing actions and events. For example, the owner of the action execution system 300 may specialize in receiving questions, requests for information, requests for recommendations, and the like, determining an appropriate response to the requests or questions, and communicating the appropriate responses back to a customer. In some embodiments, at least a portion of the action execution system 300 is a component of, or is otherwise controlled by the managing entity system 200. In general, the action execution system 300 is configured to communicate information or instructions with the managing entity system 200, the computing device system(s) 400, the consolidated resource database system 500, and/or the third party system(s) 140 across the network 150.

For example, the action execution system 300 may receive requests from the computing device system(s) 400 of the user 110 and/or the specialist 115 and communicate responsive actions to the computing device system(s) 400. The action execution system 300 may be configured to access, retrieve data from, or otherwise interact with the consolidated resource database system 500, the managing entity databases 120, the third party databases 130, and/or the third party system(s) 140. Interacting with a third party system 140 may comprise transmitting data, request parameters, and other relevant information to a machine learning engine, artificial intelligence engine, or the like, and receiving the responsive action or options for the responsive action from the machine learning engine and/or artificial intelligence engine.

Of course, the action execution system 300 may be configured to perform (or instruct other systems to perform) one or more other process steps described herein. The action execution system 300 is described in more detail with respect to FIG. 3.

The computing device system 400 may be a system owned or controlled by the managing entity, the user 110, the specialist 115, and/or a third party that specializes in providing computing devices for customers of the managing entity (e.g., the user 110), employees of the managing entity (e.g., the specialist 115), or the like. Each computing device system 400 may comprise a computer, laptop computer, mobile device (e.g., smart phone, smart watch, or the like), internet of things device, workstation, electronic kiosk, automated teller machine, or the like. In general, the computing device system 400 is configured to communicate information or instructions with the managing entity system 200, the action execution system 300, one or more other computing device systems 400, the consolidated resource database system 500, and/or the third party system(s) 140 across the network 150.

For example, the computing device system 400 may be configured to receive user input of a request that includes request parameters from the user 110 and/or the specialist 115. The computing device system 400 may transmit that received request to the managing entity system 200 and/or the action execution system 300. The computing device system 400 may then be configured to receive a response to the received request, where the response may be received from the managing entity system 200 and/or the action execution system 300 in the form of command signals or other computer readable instructions that are configured to cause a user interface of the computing device system 400 to display at least a portion of a responsive action.

Of course, the computing device system 400 may be configured to perform (or instruct other systems to perform) one or more other process steps described herein. The computing device system 400 is described in more detail with respect to FIG. 4.

The consolidated resource database system 500 may be a system owned or controlled by the managing entity and/or a third party that specializes in aggregating data from separate or disparate databases, networks, systems of record, or the like. In general, the consolidated resource database system 500 is configured to communicate information or instructions with the managing entity system 200, the action execution system 300, the one or more computing device systems 400, the managing entity databases 120, the third party databases 130, and/or the third party system(s) 140 across the network 150. For example, the consolidated resource database system 500 may be configured to access, retrieve, extract, copy, or otherwise interact with the managing entity databases 120 and/or the third party databases 130 to compile, aggregate, or otherwise consolidate data, information, and other resources that can be accessed or used by other systems of the system environment 100.

In some embodiments, the consolidated resource database system 500 comprises a single location where all data necessary to provide a responsive action to a received user request is stored in a single server or server location. In other embodiments, the consolidated resource database system 500 may comprise multiple servers across multiple locations that are accessible through a single searchable interface (e.g., as a cloud data storage system or network). In other embodiments, the consolidated resource database system 500 may comprise a system that is configured to actively and continuously maintain connections to the managing entity databases 120 and/or the third party databases 130, or maintain a cached representation of these databases, such that the consolidated resource database system 500 can be accessed and utilized to search and extract data, information, or other resources from the managing entity databases 120 and/or the third party databases.

The consolidated resource database system 500 may comprise or otherwise utilize a data feed with one or more of the managing entity databases 120 and/or third party databases 130 to continuously monitor those databases and/or to identify new data in those databases. Of course, the consolidated resource database system 500 may be configured to perform (or instruct other systems to perform) one or more other process steps described herein. The consolidated resource database system 500 is described in more detail with respect to FIG. 5.

The managing entity databases 120 may be owned, maintained, or otherwise controlled by the managing entity or a third party that provides a data management service to the managing entity. The managing entity databases 120 may comprise a network communication interfaces, processing devices, and one or more memory devices, where the processing devices are configured to perform certain actions with the memory devices and communicate these actions to the rest of the network 150 through the network communication interfaces.

The managing entity databases 120 may comprise one or more enterprise systems of record, business unit systems of record, client data, historical client data, transaction history data, customer data, internal analytical data (e.g., data related to financial market trends, data related to macro market trends, data related to industry trends, and the like), global telecommunications system network data, and the like.

The third party databases 130 may be owned, maintained, or otherwise controlled by one or more third party entities that specialize in data acquisition, compilation, aggregation, curation, and the like. The third party databases 130 may comprise network communication interfaces, processing devices, and one or more memory devices, where the processing devices are configured to perform certain actions with the memory devices and communicate these actions to the rest of the network 150 through the network communication interfaces.

The third party databases 130 may comprise one or more third party systems of record, social media data, financial market report data, data relating to news stories or events, third party entity corporate data, third party entity employee data, third party entity customer data, data relating to specific industry information and trends, exchange rate data, and the like.

The third party system 140 may be any system that communicates with, interacts with, provides services to, and the like, for any of the managing entity system 200, the action execution system 300, the computing device system(s) 400, the consolidated resource database system 500, the managing entity databases 120, and/or the third party databases 130. As such, the third party system 140 may be managed, owned, or otherwise controlled by a third party entity that specializes in providing data, analytical reports, and the like to the managing entity.

In some embodiments, the third party system 140 comprises a machine learning engine or system that is configured to receive request parameters and relevant data associated with those request parameters (either data sent directly to the third party system 140 or data made accessible to the third party system 140). The machine learning engine may then perform analysis on the received request parameters and relevant data to determine a responsive action and/or options that the managing entity system 200 and/or the action execution system 300 can identify as a responsive action. The machine learning engine can make its determinations based on historical data, preferences of the user 110 or specialist 115 that have been recorded with or made available to the machine learning engine, and feedback loops from a user 110, specialist 115, managing entity system 200, and/or action execution system 300. In some embodiments, at least a portion of the machine learning engine of the third party system 140 is a component of the action execution system 300.

In some embodiments, the third party system 140 comprises an artificial intelligence engine or system that is configured to receive request parameters and relevant data associated with those request parameters (either data sent directly to the third party system 140 or data made accessible to the third party system 140). The artificial intelligence engine may then perform analysis on the received request parameters and relevant data to determine a responsive action and/or options that the managing entity system 200 and/or the action execution system 300 can identify as a responsive action. The artificial engine can make its determinations based on historical data; preferences of the user 110 or the specialist 115 that have been recorded or made available to the machine learning engine; feedback loops from the user 110, specialist 115, managing entity system 200, and/or the action execution system 300; the request parameters; a knowledge base made available to the artificial intelligence engine; and/or any other data, information, logic rules and parameters, or the like.

FIG. 2 provides a block diagram illustrating the managing entity system 200, in greater detail, in accordance with embodiments of the invention. As illustrated in FIG. 2, in one embodiment of the invention, the managing entity system 200 includes one or more processing devices 220 operatively coupled to a network communication interface 210 and a memory device 230. In certain embodiments, the managing entity system 200 is operated by a first entity, such as a financial institution, while in other embodiments, the managing entity system 200 is operated by an entity other than a financial institution.

It should be understood that the memory device 230 may include one or more databases or other data structures/repositories. The memory device 230 also includes computer-executable program code that instructs the processing device 220 to operate the network communication interface 210 to perform certain communication functions of the managing entity system 200 described herein. For example, in one embodiment of the managing entity system 200, the memory device 230 includes, but is not limited to, a network server application 240, a resource aggregation application 250 which includes managing entity database data 252 and third party database data 254, a customer interface application 260 which includes multi-channel customer communication data 262, specialist communication data 264, and other computer-executable instructions or other data. The computer-executable program code of the network server application 240, the resource aggregation application 250, and/or the customer interface application 260 may instruct the processing device 220 to perform certain logic, data-processing, and data-storing functions of the managing entity system 200 described herein, as well as communication functions of the managing entity system 200.

In one embodiment, the resource aggregation application 250 includes managing entity database data 252 and third party database data 254. The managing entity database data 252 may comprise information about which managing entity databases (e.g. the managing enterprise databases 120 of FIG. 1) are available to the managing entity system 200 within the system environment 100, how to access those databases, formatting information for those databases, authorization or permission information for those databases, ownership of those databases, and the like. As such, the resource aggregation application 250 may be configured to use the managing entity database data 252 to identify one or more databases related to a received request (including request parameters) that should be accessed to extract and aggregate data, information, or other resources that may allow the managing entity system 200 to help generate a responsive action to the received request.

Similarly, the third party database data 254 information about which third party databases (e.g. the third party databases 130 of FIG. 1) are available to the managing entity system 200 within the system environment 100, how to access those databases, formatting information for those databases, authorization or permission information for those databases, ownership of those databases, and the like. As such, the resource aggregation application 250 may be configured to use the third party database data 254 to identify one or more databases related to a received request (including request parameters) that should be accessed to extract and aggregate data, information, or other resources that may allow the managing entity system 200 to help generate a responsive action to the received request.

The customer interface application 260 is configured to identify, establish, maintain, and otherwise control communication channels, interfacing portals, and the like with the one or more computing device systems 400 of the system environment 100. As such, the customer interface application 260 may comprise multi-channel customer communication data 262 that provides information about how to establish and maintain communication channels with computing devices of the user 110 or the specialist 115. For example, the multi-channel customer communication data 262 may include email addresses, phone numbers, login information or credentials, and the like for each known customer (e.g., user 110).

Similarly, the specialist communication data 264 may comprise data or other information related to established communication channels for interacting with, interfacing with, and/or providing portals to the specialist 115 via a computing device system (e.g., a workstation, personal computer, laptop computer, or other computing device).

The network server application 240, the resource aggregation application 250, and the customer interface application 260 are configured to invoke or use the managing entity database data 252, the third party database data 254, the multi-channel customer communication data 262, the specialist communication data 264, and the like when communicating through the network communication interface 210 with the action execution system 300, the computing device system(s) 400, the consolidated resource database system 500, the managing entity databases 120, the third party databases 130, and/or the third party system(s) 140.

As used herein, a "communication interface" generally includes a modem, server, transceiver, and/or other device for communicating with other devices on a network, and/or a user interface for communicating with one or more customers. Referring again to FIG. 2, the network communication interface 210 is a communication interface having one or more communication devices configured to communicate with one or more other devices on the network 150, such as the action execution system 300, the computing device system(s) 400, the consolidated resource database system 500, the managing entity databases 120, the third party database 130, the third party system(s) 140, and the like. The processing device 220 is configured to use the network communication interface 210 to transmit and/or receive data and/or commands to and/or from the other devices connected to the network 150.

FIG. 3 provides a block diagram illustrating the action execution system 300, in greater detail, in accordance with embodiments of the invention. As illustrated in FIG. 3, in one embodiment of the invention, the action execution system 300 includes one or more processing devices 320 operatively coupled to a network communication interface 310 and a memory device 330. In certain embodiments, the action execution system 300 is operated by a first entity, such as a financial institution, while in other embodiments, the action execution system 300 is operated by an entity other than a financial institution.

It should be understood that the memory device 330 may include one or more databases or other data structures/repositories. The memory device 330 also includes computer-executable program code that instructs the processing device 320 to operate the network communication interface 310 to perform certain communication functions of the action execution system 300 described herein. For example, in one embodiment of the action execution system 300, the memory device 330 includes, but is not limited to, a network server application 340 and one or more action execution applications 350 which include action execution data 352, and other computer-executable instructions or other data. The computer-executable program code of the network server application 340 and/or the action execution application(s) 350 may instruct the processing device 320 to perform certain logic, data-processing, and data-storing functions of the action execution system 300 described herein, as well as communication functions of the action execution system 300.

One action execution application 350 may comprise a transaction processing application that is configured to receive a request to perform a financial transaction, communicate with the parties to the transaction (including financial institutions behind the transaction), make determinations as to whether the transaction can be performed based on action execution data 352 of customer account data, and execute the transaction on the requesting user's behalf. Another action execution application 350 may be a market analysis application that is configured to receive requests for analysis of industry-specific or overall market-specific performance statistics and information. The market analysis application can then perform the market analysis based on action execution data 352 of market analysis data, market performance data, market trend data, industry-specific data, and the like, and then provide the results to the computing device of the user.

Another action execution application 350 may comprise a product analysis application configured to receive a request for information and statistics about a particular product or service, identify action execution data 352 relating to the makeup, manufacture, distribution, sale, returns, feedback, maintenance, success rate, and other analytical information about the requested product or service, and provide a generated product analysis report to the computing device of the user. Similarly, the action execution application 350 may comprise a product comparison application that receives similar action execution data and generates a comparison report for each of a plurality of products or services that are included in the request. The product comparison application can then generate a report to the user that illustrates the similarities and/or differences between each of the products or services included in the product comparison request.

The action execution application 350 may also comprise a vulnerability management or vulnerability exposure reporting application that is configured to receive a request involving a particular potential vulnerability of the customer and/or a request to identify one or more vulnerabilities and their potential impact on the customer. These vulnerability-based applications may then access action execution data 352 related to internal vulnerabilities of the customer, external vulnerabilities related to the business of the customer, vulnerability exposure information, and other data, information, or resources that may be associated with vulnerability management. These vulnerability applications can then analyze the action execution data based on parameters of the request to generate models, reports, recommendations, and the like that can be presented to the user.

In some embodiments, an action execution application 350 may be an application configured to receive and/or process user inputs. For example, one action execution application 350 may comprise a spoken voice parsing or interactive voice response application that is configured to receive and/or identify user input in the form of spoken word and turn the user input into a computer readable language. The action execution application 350 may also be configured to interact directly with a particular type of computing device. For example, the action execution application 350 may comprise an internet of things device interaction application that is configured to wirelessly communicate with a wireless device that can receive user input (e.g., spoken word, touch-screen input, typed input, and the like) and transmit user output (e.g., recorded or electronic spoken word, visual display, color displays, numerical displays, or the like).

The action execution applications 350 may also include communication applications configured to provide advanced communication with the user 110 or specialist 115, through the computing device system 400 of the user 110 or specialist 115. For example, one action execution application 350 may comprise a robotic process automation messaging system, chatbot, automated text messaging or online messaging system, and the like. Similarly, one action execution application 350 may comprise a voice interfacing system, vocal recognition system, interactive voice response system, or the like. These communication-based action execution applications 350 may be used in conjunction to receive one type of user input (e.g., spoken word) and provide a different type of output (e.g., online textual message). These communication applications may also be used in conjunction with other action execution applications 350 to identify a request, including request parameters, from a user 110 or specialist 115, to help identify which other action execution applications 350 should be utilized, receive responsive instructions from those other action execution applications 350, and communicate the response(s) back to the computing device system 400 of the user 110 or specialist 115.

Importantly, the action execution application 350 may comprise one or more machine learning applications, or be configured to transmit analytical or modeling requests to a machine learning engine (e.g., the third party system 140 of FIG. 1), along with any action execution data 352 comprising information that should be input into an analytical or modeling action, and receive a response or multiple possible responses to the request from the machine learning engine. Likewise, the action execution application 350 may comprise one or more artificial intelligence applications, or be configured to transmit analytical or modeling requests to an artificial intelligence computing engine (e.g., the third party system 140 of FIG. 1), along with any action execution data 352 comprising information that should be input into an analytical or modeling action, and receive a response or multiple possible responses to the request from the artificial intelligence computing engine.

The network server application 340 and the action execution application(s) 350 are configured to invoke or use the action execution data 352, and the like when communicating through the network communication interface 310 with the managing entity system 200, the computing device system(s) 400, the consolidated resource database system 500, the managing entity databases 120, the third party databases 130, and/or the third party systems 140.

FIG. 4 provides a block diagram illustrating a computing device system 400 of FIG. 1 in more detail, in accordance with embodiments of the invention. In one embodiment of the invention, the computing device system 400 is a mobile telephone. However, it should be understood that a mobile telephone is merely illustrative of one type of computing device system 400 that may benefit from, employ, or otherwise be involved with embodiments of the present invention and, therefore, should not be taken to limit the scope of embodiments of the present invention. Other types of computing device systems 400 may include portable digital assistants (PDAs), pagers, mobile televisions, gaming devices, laptop computers, cameras, video recorders, audio/video player, radio, GPS devices, electronic kiosks, automated teller machines, internet of things devices, smart home devices, workstations, tablet computers, wearable devices, or any combination of the aforementioned.

Some embodiments of the computing device system 400 include a processor 410 communicably coupled to such devices as a memory 420, user output devices 436, user input devices 440, a network interface 460, a power source 415, a clock or other timer 450, a camera 480, and a positioning system device 475. The processor 410, and other processors described herein, generally include circuitry for implementing communication and/or logic functions of the computing device system 400. For example, the processor 410 may include a digital signal processor device, a microprocessor device, and various analog to digital converters, digital to analog converters, and/or other support circuits. Control and signal processing functions of the computing device system 400 are allocated between these devices according to their respective capabilities. The processor 410 thus may also include the functionality to encode and interleave messages and data prior to modulation and transmission. The processor 410 can additionally include an internal data modem. Further, the processor 410 may include functionality to operate one or more software programs, which may be stored in the memory 420. For example, the processor 410 may be capable of operating a connectivity program, such as a web browser application 422. The web browser application 422 may then allow the computing device system 400 to transmit and receive web content, such as, for example, location-based content and/or other web page content, according to a Wireless Application Protocol (WAP), Hypertext Transfer Protocol (HTTP), and/or the like.

The processor 410 is configured to use the network interface 460 to communicate with one or more other devices on the network 150. In this regard, the network interface 460 includes an antenna 476 operatively coupled to a transmitter 474 and a receiver 472 (together a "transceiver"). The processor 410 is configured to provide signals to and receive signals from the transmitter 474 and receiver 472, respectively. The signals may include signaling information in accordance with the air interface standard of the applicable cellular system of the wireless telephone network 152. In this regard, the computing device system 400 may be configured to operate with one or more air interface standards, communication protocols, modulation types, and access types. By way of illustration, the computing device system 400 may be configured to operate in accordance with any of a number of first, second, third, and/or fourth-generation communication protocols and/or the like. For example, the computing device system 400 may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols, with LTE protocols, with 4GPP protocols and/or the like. The computing device system 400 may also be configured to operate in accordance with non-cellular communication mechanisms, such as via a wireless local area network (WLAN) or other communication/data networks.

As described above, the computing device system 400 has a user interface that is, like other user interfaces described herein, made up of user output devices 436 and/or user input devices 440. The user output devices 436 include a display 434 (e.g., a liquid crystal display or the like) and a speaker 432 or other audio device, which are operatively coupled to the processor 410.

The user input devices 440, which allow the computing device system 400 to receive data from a user such as the user 110 or specialist 115, may include any of a number of devices allowing the computing device system 400 to receive data from the user 110 or specialist 115, such as a keypad, keyboard, touch-screen, touchpad, microphone, mouse, joystick, other pointer device, button, soft key, and/or other input device(s). The user interface may also include a camera 480, such as a digital camera.

The computing device system 400 may also include a positioning system device 475 that is configured to be used by a positioning system to determine a location of the computing device system 400. For example, the positioning system device 475 may include a GPS transceiver. In some embodiments, the positioning system device 475 is at least partially made up of the antenna 476, transmitter 474, and receiver 472 described above. For example, in one embodiment, triangulation of cellular signals may be used to identify the approximate or exact geographical location of the computing device system 400. In other embodiments, the positioning system device 475 includes a proximity sensor or transmitter, such as an RFID tag, that can sense or be sensed by devices known to be located proximate a merchant or other location to determine that the computing device system 400 is located proximate these known devices. The positioning system device 475 may play a crucial role in transmitting location information associated with the computing device system 400 for determining a location of the computing device.

The computing device system 400 further includes a power source 415, such as a battery, for powering various circuits and other devices that are used to operate the computing device system 400. Embodiments of the computing device system 400 may also include a clock or other timer 450 configured to determine and, in some cases, communicate actual or relative time to the processor 410 or one or more other devices.

The computing device system 400 also includes a memory 420 operatively coupled to the processor 410. As used herein, memory includes any computer readable medium (as defined herein below) configured to store data, code, or other information. The memory 420 may include volatile memory, such as volatile Random Access Memory (RAM) including a cache area for the temporary storage of data. The memory 420 may also include non-volatile memory, which can be embedded and/or may be removable. The non-volatile memory can additionally or alternatively include an electrically erasable programmable read-only memory (EEPROM), flash memory or the like.

The memory 420 can store any of a number of applications which comprise computer-executable instructions/code executed by the processor 410 to implement the functions of the computing device system 400 and/or one or more of the process/method steps described herein. For example, the memory 420 may include such applications as a conventional web browser application 422 and/or a customer interface application 421 (or any other application provided by the managing entity system 200). These applications also typically instructions to a graphical user interface (GUI) on the display 434 that allows the user 110 to interact with the computing device system 400, the managing entity system 200, and/or other devices or systems. In one embodiment of the invention, when the user 110 decides to enroll in a customer interface application 421 program, the user 110 downloads, is assigned, or otherwise obtains the customer interface application 421 from the managing entity system 200, or from a distinct application server (e.g., from the action execution system 300 or a third party system 140). In other embodiments of the invention, the user 110 interacts with the managing entity system 200 or the action execution system 300 via the web browser application 422 in addition to, or instead of, the customer interface application 421.

The customer interface application 421 may comprise data, information, pre-loaded computer readable instructions, or otherwise be capable of receiving command signals or instructions from the managing entity system 200 and/or the action execution system 300 that are configured to cause the computing device system 400 to communicate information to the user 110 or specialist 115 via the user interface 430. The customer interface application 421 may be configured to embody a singular, centralized point of interaction for a user 110 and/or a specialist 115. For example, the user 110 or specialist 115 can provide user input in the form of a request using the user input devices 440 (e.g., via a keypad, touchpad, microphone, or the like). This request can be received by the customer interface application 421, which can in turn perform one or more preliminary verification steps to make sure the received user input conforms to what the managing entity system 200 and/or the action execution system 300 is able to process to determine a responsive action. Of course, the web browser application 422 may be configured to accomplish the same functions as described for the customer interface application 421. As such, any user 110 and/or specialist 115 is presented with a consistent interfacing portal when interacting with the managing entity system 200 and/or the action execution system 300 via a computing device system 400.

The memory 420 of the computing device system 400 may comprise a Short Message Service (SMS) application 423 configured to send, receive, and store data, information, communications, alerts, and the like via the wireless telephone network 152.

The memory 420 can also store any of a number of pieces of information, and data, used by the computing device system 400 and the applications and devices that make up the computing device system 400 or are in communication with the computing device system 400 to implement the functions of the computing device system 400 and/or the other systems described herein.

While the computing device system 400 is generally described as a desktop computer, laptop computer, workstation, or mobile device, it should be known that the computing device system 400 may comprise one or more other computing devices. For example, the computing device system 400 may be embodied as an electronic kiosk or automated teller machine that a user 110 can access to request information or other actions and receive a response. The computing device system 400 may additionally or alternatively embody an internet of things device with voice recognition technology to receive verbal requests from the user 110 and/or the specialist 115, and communicate the response via spoken audio and/or through a visual display.

FIG. 5 provides a block diagram illustrating a consolidated resource database system 500, in accordance with embodiments of the invention. As illustrated in FIG. 5, the consolidated resource database system 500 generally includes, but is not limited to, a network communication interface 510, one or more processing devices 520, and one or more memory devices 550. The processing device 520 is operatively coupled to the network communication interface 510 and the memory device 550. In one embodiment of the consolidated resource database system 500, the memory device 550 stores, but is not limited to, a system data feed interface 560 and consolidated resource database 570. In some embodiments, the consolidated resource database 570 stores data including, but not limited to, the data from the managing entity databases 120 and/or the data from the third party databases 130. In one embodiment of the invention, both the system data feed interface 560 and the consolidated resource database 570 may associate with applications having computer-executable program code that instructs the processing device 520 to operate the network communication interface 510 to perform certain communication functions involving the consolidated resource database 570 described herein. In one embodiment, the computer-executable program code of an application associated with the consolidated resource database 570 may also instruct the processing device 520 to perform certain logic, data processing, and data storing functions of the application associated with the consolidated resource database 570 described herein.

The network communication interface 510 is a communication interface having one or more communication devices configured to communicate with one or more other devices on the network 150. The processing device 520 is configured to use the network communication interface 510 to receive information from and/or provide information and commands to the managing entity system 200, the action execution system 300, the computing device systems 400, the managing entity databases 120, the third party databases 130, third party systems 140, and/or other devices via the network 150. In some embodiments, the processing device 520 also uses the network communication interface 510 to access other devices on the network 150, such as one or more web servers of one or more third-party data providers. In some embodiments, one or more of the devices described herein may be operated by a second entity so that the second entity controls the various functions involving the consolidated resource database system 500. For example, in one embodiment of the invention, although the managing entity system 200 is operated by a first entity (e.g., a financial institution), a second entity operates the consolidated resource database system 500 that stores received data in the consolidated resource database 570.

As described above, the processing device 520 is configured to use the network communication interface 510 to gather data, such as data associated with tail events of the managing entity that can be stored in the consolidated resource database 570 from various data sources. The processing device 520 stores the data that it receives in the consolidated resource database 570 within the memory device 550. The system data feed interface 560 may either continuously transmit data from the consolidated resource database 570 to the managing entity system 200, or the system data feed interface 560 may be configured to be continuously accessible by the managing entity system 200 such that data from the consolidated resource database 570 may be continuously accessed, extracted, and/or analyzed.

Referring now to FIG. 6, a flowchart is provided to illustrate one embodiment of a process 600 for execution of consolidated resource-based actions, in accordance with embodiments of the invention. In some embodiments, the process 600 may include block 602, where the system monitors a plurality of disparate databases. Monitoring the databases may comprise establishing a data feed to each of the plurality of databases to receive data, information, changes to data, updates to data, articles, projections, opinions, and other resources from those databases. While the term "database" is used to describe what the system is monitoring, it should be known that systems of record, servers, live website pages, website caches, communication records, messaging records, historical financial data, and the like are contemplated as being databases and/or being the resources that are monitored within the databases. These databases may be the managing entity databases 120 and/or the third party database 130 described in FIG. 1. For example, the managing entity databases 120 may comprise internal systems of record, client or customer data (including account data), global telecommunications systems networks, line of business data networks, server data, and the like. Likewise, the third party database 130 may comprise market data, social media data, news story data, website data, website cache data, government data, third party reporting data, and the like.

The system may continuously monitor the plurality of databases by continuously monitoring a plurality of databases associated with a plurality of disparate systems of record, disparate networks, disparate entities, and the like.

The system may, in some embodiments, aggregate data from the plurality of disparate databases into a consolidated resource database, an integrated resource database, or another or the like. In some embodiments, aggregating the data from the plurality of disparate databases may comprise establishing a cloud data storage server that is accessible by an action execution system or another computing device system or network that is configured to analyze or otherwise interact with the data during the process 600. In other embodiments, the system may not fully aggregate the data from the disparate databases, but may maintain a connection with each of the plurality of disparate databases such that the system can access and retrieve data, information, or other resources from each of the plurality of disparate databases at any point in time.

Monitoring the databases may comprises establishing a consolidated resource database based on an extraction of data from the disparate databases and then continuously or periodically checking each database to determine whether a change in the data has occurred. If a change has occurred, the system can update the consolidated resource database with that change. In other embodiments, one or more databases may actively provide a data feed (e.g., continuously or periodically) to the consolidated resource database such that the system has the most up-to-date information readily available at any given point in time.

In some embodiments, the process 600 includes block 604, where the system receives a request from a computing device of a user, where the received request comprises request parameters. The user described with respect to this process 600 may be a customer of the managing entity system (e.g., the user 110 from FIG. 1), an employee of a customer institution of the managing entity system (e.g., the user 110 from FIG. 1), and/or an employee of the managing entity system (e.g., the specialist 115 from FIG. 1), or the like. In embodiments where the user is a customer or employee of a customer institution, the user may be requesting information, analysis, recommendations, predications, financial reports, modeling reports, or other insight related to the business of the customer or the customer institution from the managing entity system.

For example, the customer user may request financial statements or reports, including account balance, transaction history information, and the like. A customer user may request an answer about the structure, setup, or other information about the customer's account. The customer user may request if there are any positive pay exceptions outstanding, if there are any wires in repair or that need additional information prior to their completion or execution, and the like.

The customer user may additionally or alternatively request the documentation required to open certain accounts, including accounts located in new countries. The customer user may request contact information for one or more specialists that can assist the customer user in executing forms, data analysis, or the like. The customer user may request the addition or removal of individuals from one or more accounts of the customer institution, or change the authorizations of each user related to the accounts of the customer institution, including online permissions. The customer user may request security reviews of an account, in general, or of the user's current connections (e.g., if the user is processing from a new Internet Protocol address, computing device, or location).

The customer user can also input more advanced requests. For example, a customer user may ask how the customer user, or the customer institution, is doing against its peers (either generally, as determined by the system, or by providing specific peers or competitors). The customer user can request feedback or recommendations for avoiding unnecessary payments, recommendations for which payment methods should be used for certain transactions, what payment types competitors are using (e.g., based on country, time of day, purchased product, and the like).

Furthermore, the customer user can request information about what the customer institution's cash position has been in the past, where it currently stands, and what the system can model for future cash positions. The customer user can request identification of vulnerabilities to the financial standing of the customer institution, including compliance requirements, regulatory requirements, external pressures (e.g., country or region specific issues like potential conflicts, regime changes, legal changes, and the like), competitor pressures, and the like.

The customer user can also request input on potential strategies, including how to implement or improve hedging models. Furthermore, the customer user can request a hedging model to better understand the customer institution's hedging position. For any request that involves modeling, the request may include a request to be able to adjust or manipulate one or more inputs for the model such that the model can change in real time as the user makes the input adjustments.

The customer user can also request general questions about what aspects of the customer institution's business should be considered for improvement, support, or other adjustments to put the customer institution in a better financial position. These general questions may include requests for growth opportunities within the field of business related to the customer institution.

The customer user can also request information about its outstanding or expected accounts receivables, as well as information about each of its own customers or clients. This information may include expected payment dates (e.g., based on trends), payment amounts (e.g., total amounts, percentage of what is billed, amount that likely will be delivered late, and the like). Such a request can include a request for an analysis of the client's business, the industry market around the client or its business, news stories, and the like, such that an external issue that may prevent the client from making normal payments or services to the customer institution can be identified by the system and reported to the customer institution.

The customer user may be looking to acquire or otherwise merge with another entity and can therefore request information about the target entity, recommended structuring of the acquisition, recommended liquidity levels, recommended borrowing amounts and strategies, and the like.

The customer user may request options for which financial products or services that the customer can utilize to optimize cash and liquidity management, working capital, investment strategies, and the like.

Social or governmental trends and analysis can also be requested by the customer user. For example, the customer user may request a likelihood of a raising of interest rates in one or more countries, an expected data of a change in interest rates in one or more countries, and the like. Similarly, the customer user can request a likelihood of a change in political leadership, regulation changes, and the like. In addition, the customer user can request an impact report for such a change in social or government trends.

In embodiments where the user is a specialist or other employee of the managing entity system, the user may be requesting reports, status checks, background information for a presentation or financial discussion with a customer, modeling to provide analytical insight to the customer, and the like. These requests from the specialist user can be similar or identical to the requests for the customer user, but the system may provide more detailed information, more complex information, and the like to the specialist due to the expertise held by the specialist in understanding the information and being able to perform analysis on that information.

In some embodiments, the user request may require or include a request for an immediate response. In other embodiments, the user request may include a request for a notification every time a triggering event happens. For example, if the request is for the identification of a vulnerability, the system can automatically notify the user in the event a potential vulnerability is detected by the system.

The system may be configured to establish a single, central point of contact or interfacing portal that is accessible to all customers, users, specialists, and the like. For example, the system may provide an online portal, a mobile device application portal, or the like to the computing device of the user. This central portal may be configured to receive a plurality of requests or types of requests, interact with the managing entity system and/or the action execution system 300 to communicate the requests, receive instructions from the managing entity system and/or the action execution system, and communicate those instructions back to the computing device of the user via the central portal. In such embodiments, block 604 may further involve receiving the request from the computing device of the user via the online portal.

In embodiments where the computing device of the user comprises a desktop computer, personal computer, laptop computer, tablet computer, mobile device, or any other computing device that can receive input via a keypad or keyboard, the system request may be received as user input in the form of a keypad entry into a data field (e.g., on a website, online portal, application portal, customer interface application, or the like). In embodiments where the computing device of the user comprises an electronic kiosk, an automated teller machine, a tablet computer, mobile device, or any other touch-screen enabled device, the request may be input by a touch-screen selection of a request. For example, the system may display selectable options of requests on a user interface display of the computing device and the user selects one or more of the selectable options as the user input of the request.

In embodiments where the computing device comprises an internet of things device, a computing device integrated with an automobile, a mobile device, a wearable device, or any other device that has microphone capabilities, the request may be input by the user via voice commands that are received by the microphone and interpreted by a voice analyzing software to identify the request and request parameters.

As used herein, the term "request parameters" refers to the elements or structures of the request that can be analyzed to give context, specificity, or other input for what the user is requesting. For example, the request parameters may be actual parameters of a question (e.g., the timeframe for a requested financial report, the columns or data types of the financial report, the source from which to pull data to respond to a question, or the like). In some embodiments, the request parameters comprise the elements or keywords that the user is requesting (e.g., "financial report," "predictive financial model," "product comparison," "service comparison," "market analysis," or the like). The request parameters can be utilized by a customer interface application, by a machine learning engine, and/or by an artificial intelligence engine to identify what the customer is requesting, and to perform analysis on the request.

The system may utilize one or more communication applications to initiate or continue the interaction between the system and the user, via the computing device of the user. For example, the system may utilize a chatbot application, interactive voice response application, text messaging application, online messaging application, or the like to provide a conversation-like communication platform that is configured to prompt the user for the request, receive the request, prompt the user for any additional information or request parameters, and the like. For example, the system may provide an online messaging platform with a chatbot application that has access to at least some information about the user. Through this online messaging platform, the system can prompt the user to provide user input of a request, receive questions, requests, or other user input from the user, determine appropriate communication responses, and transmit those appropriate communication responses back to the user in a manner that is typical of human conversations.

Additionally, in some embodiments, the process 600 includes block 606, where the system identifies relevant data from the monitored plurality of disparate databases based on the request parameters. Again, the request parameters comprise the structural and identifiable aspects of the user's request. In this way, the request parameters define the scope of the request, the boundaries of the request, the desired output, time-based information, and the like that enable the system to determine what exactly the user is requesting. Once the scope, boundaries, desired output, and time-based information have been received, or as this information is being received, the system can automatically begin searching the monitored plurality of disparate databases to identify the data, information, account information, relevant articles, and other resources that may provide an answer or that can be used to determine an answer or response to the request.

In embodiments where the data or resources from the monitored plurality of disparate databases is aggregated and stored in a consolidated resource database, the system may identify the relevant data through an analysis of the data stored in the consolidated resource database. In embodiments where the data or resources from the monitored databases are not stored in a consolidated resource database, the system can identify which databases (or other data sources) likely contain data or information related to the request parameters (e.g., pertinent databases) and perform data searches within each of those pertinent databases to identify and/or extract the relevant data as it relates to the request parameters.

In some embodiments, the system may compile the relevant data in a separate database, file, folder, or the like for subsequent analysis of the relevant data. This separate data location may be a temporary file, folder, or the like that can be deleted, wiped clean, or the like once a full analysis of the relevant data has been completed by the system. The separate data location can be accessible by one or more systems and applications within the system environment (e.g., the system environment 100), such that analytical tools like the action execution system 300 and third party systems 140 like a machine learning engine and/or an artificial intelligence engine can access the relevant data from a single location without needing to perform additional data analysis to determine which data is indeed relevant.

As noted above, the relevant data identified by the system is dependent on the user making the request, the type of request being made by the user, the scope of the request, and any other request parameters that are input by the user. Therefore, the relevant data identified by the system can change for each request that is received.

As an example, if the user inputted request is for a change to a financial account and/or online access to financial information of a customer institution's account, the system may identify the account in question, identify the account data, identify each individual with access to the account, identify permissions or authorizations for each user of the account, identify one or more individuals employed by the customer institution that may be provided with access to the account in the future, and the like.

In another example, if the user inputted request is for information about outstanding or expected accounts receivable for a customer institution, including information about paying clients of the customer institution, the system may identify current and historical data for the accounts receivables of the customer institution (i.e., any data that can be analyzed to identify trends in payment amounts, payment dates, delays, and the like). The system can also pull social media data, news data, market data, and the like that may be related to one or more of the clients of the customer institution (i.e., any data or information that can be analyzed to identify a change in the status or likelihood that the client of the customer institution will make an accounts receivable payment in time, and the like).

If the user inputted request is for information about a target entity and/or structuring of the customer institution for a potential merger or acquisition, then the system can identify data related to the structure of the customer institution, the target entity, information about recent mergers or acquisitions by entities in the same field or at the same value, market rates, recommended structures of acquisitions, recommended liquidity levels for acquisitions, or any other information that can be used to identify how the customer institution could or should structure the acquisition.

The process 600 may also include block 608, where the system determines a responsive action based on the relevant data and the request parameters. This determination step can be performed by the system in a number of ways, depending on the scope of the request, the analytical tools established in the system environment (e.g., the system environment 100), and the like. For example, if the user request is a simple request for a known data value (e.g., account balance, current accounts receivable amount, market status at a particular point in time, or any other known data value), the system can search the relevant data for that particular data value, identify the value, and determine that the responsive action is to present that data value to the user. These determinations can be made or initiated by the system re-structuring the request or request parameters into computer readable program code or instructions that are configured to cause one or more processors to perform actions like scanning databases, extracting certain data, transmitting certain data to one or more analytical engines, and the like.

Another determination on the simpler end of the spectrum may relate to a requested transaction, where the system may make a determination of the sending account, amount of funds to be withdrawn from the account, whether the amount of funds is adequate for the requested transaction, how the funds should be transferred, the receiving account, the financial institution associated with the receiving account, and the like. The system may then establish or otherwise determine the responsive action to be an execution of the account by withdrawing the requested transaction amount from the sending account and transferring the withdrawn funds to the receiving account, and may include a time-based component.

While some responsive actions may be relatively simple or straight forward answers, deeper analysis is required to determine responsive actions for many of the expected requests. For example, a request regarding which financial product is a best fit for a long-term growth perspective of a customer institution would require financial modeling of the customer institution, and possibly financial modeling of one or more other factors like competitors, the projected market of the industry, the projected market as a whole, and the like to determine which of the requested financial products is best suited for the customer institution. In this example, the system may have already identified the relevant data to be information about the requested financial products, market data (both industry-specific and overall), financial reports or outlooks, opinions, competitor institution financial data, and the like.

The system may have placed this relevant data in a temporary database or file. In such embodiments, the system may transmit computer instructions to an artificial intelligence engine or system to perform modeling and/or analysis of the relevant data to make a determination about which of the requested financial products is a best fit for long-term growth of the customer institution. These instructions may include the relevant data or instructions for how the artificial intelligence engine can or should access the relevant data, such that the artificial intelligence engine has all relevant information and request parameters as an input prior to performing its analysis. The artificial intelligence engine would then perform its analysis to model out one or more likely scenarios for the customer institution based on the input, and provide an output of either (1) the financial product that the customer institution should utilize, and/or (2) the likely outcomes of each requested financial product, thereby allowing the system or the user to understand the outcomes and make a determination as to which financial product has the most favorable outcome for the customer institution.

Determining the responsive action may include determining how to present the data value or, in general terms, the answer to the user's request. The system can utilize its chatbot applications, interactive voice response applications, or the like to put the responsive value in a conversational form (e.g., in a sentence like "The account balance as of XXXX time period is $XXXX.").

Finally, the process 600 may continue to block 610, where the system executes the responsive action by at least causing a user interface of the computing device of the user to communicate a response to the received request. In embodiments where the system has provided a central or online portal to the computing device of the user, the system may cause the user interface of the computing device of the user to communicate the response to the received request via the central or online portal.

In most responsive actions, the system will have determined that the user should receive a notification of either an answer and/or an indication that an executed action has taken place, is taking place, or will take place. For example, if the user has requested an account update, the communication to the computing device of the user may comprise a notification displayed or emitted audibly through speakers of the statistics relating to the requested account. Similarly, if the request was for a transfer of funds, the communication to the user may comprise a notification that the transfer has been executed and was successful.

In embodiments where recommendations, predictions, modeling, or other detailed analytics have been performed, the response and communication may comprise a transmission of detailed reports, options to allow the user to be connected to a specialist or other employee of the managing entity to discuss the detailed reports, options to allow the user to set up or otherwise establish one or more products or services related to the report, or the like.

The system may receive feedback from the user during and/or after providing the responsive action, where the feedback provides an indication as to whether the responsive action addresses the user's request or an extent to which the responsive action addressed the user's request. The feedback may include information about a point in time during the providing of the responsive action that the user requested to interact with a specialist of the managing entity to address the request. The system may store the feedback information in one or more databases associated with the machine learning and/or artificial intelligence engines such that the machine learning and artificial intelligence engines improve and grow their knowledge base to provide improved responses to subsequent requests. In this way, usage patterns inform subsequent decision making by the artificial intelligence and machine learning engines of the system to provide enhanced and more accurate responsive actions to users.

FIG. 7A provides one embodiment of a sample computing device user interface display 700 that may be used that may be provided as part of a system for execution of consolidated resource-based actions. The computing device user interface display 700 may be presented on a user interface of the one or more computing device systems 400 of the system environment 100 described in FIG. 1 as a portal of allowing user (e.g. the user 110 or the specialist 115) to interact and/or communicate with the system.

As shown in FIG. 7A, the computing device user interface display 700 may include navigation tabs 702, an action history window 704, a requests window 706, a contact window 708, a news window 710, a messages window 712, as action execution window 714, a tasks window 716, an information window 718, and a communication window 720. The navigation tabs 702 may provide one or more additional or supplemental application portals that a user (e.g., the user 110 and/or a specialist 115) can access to perform actions or receive information under this system. The action history window 704 may comprise a listing of recent and/or past transactions, actions, adjustments, and the like, where the listing may comprise links to additional information about each individual action.

The requests window 706 may comprise one or more selectable links that, when selected, initiate one or more actions associated with the system. In some embodiments, these selectable links may be associated with one or more recommended actions, one or more suggested actions, one or more common actions, one or more frequent actions, or the like.

The contact window 708 may comprise a listing of contact information for one or more individuals (e.g., the specialist 115) or business groups that may be trained or otherwise designated to provide assistance to a user (e.g., the user 110) in interacting with the computing device user interface display 700 or the overall system.

The news window 710 may comprise a listing of one or more headlines, news stories, new features, suggested features, recommended features, common features, or the like that may be identified for the user (e.g., the user 110 or the specialist 115) based on the user's expected interactions with the system or the computing device user interface display 700.

The messages window 712 may comprise one or more messages, electronic mail notifications, reports, or the like that have been transmitted to or transmitted from the user (e.g., the user 110 or the specialist 115) logged into the portal.

The action execution window 714 may comprise a means for allowing the user to execute particular types of actions (e.g., transactions, transfers, report requests, and the like). The action execution window 714 may include selectable icons to allow the user to execute one or more common actions, recommended actions, personalized actions, expected actions, or the like. The tasks window 716 may comprise a listing of one or more future actions or events that may require input, approval, or other actions by the user. The information window 718 may include account information, account trend information, accounts receivable information, customer information, market information or data, and the like. The information window 718 may include functionality to allow a user to adjust which information is displayed.

The communication window 720 is illustrated in an initial notification configuration in FIG. 7A, where an alert or other communication from the system to the user is presented without taking up a significant portion of the user interface display 700. In some embodiments, this communication window may display a notification as part of the system's execution of the responsive action (e.g., requesting approval from the user, requesting a signature or other action of the user, requesting user input, informing the user of a potential issue, informing the user of results to a modeling report, or the like). In other embodiments, the communication window 720 may include a prompt for the user to initiate a request.

Turning now to FIG. 7B, the sample computing device user interface display 700 now includes an expanded communication window 720 and an optional supplemental window 722. The expanded communication window 720 may comprise additional functionality or features for allowing the user to communicate with the system. For example, the communication window 720 may include a longer form of an alert, notification, prompt, response, report, or the like, and may provide a text box or spoken voice option to allow the user to provide a user input. The supplemental window 722 may comprise information, modeling results, a report, statistical information, results or responses to a request, offers for products or services, or the like.

FIG. 8 provides a sample mobile computing device user interface display 800 that is configured to provide similar features, looks, functionality, and capabilities as the sample computing device user interface display 700 of FIGS. 7A and 7B. As such, FIG. 8 illustrates a system message window 802 that may comprise text, scrolling text, or other information that is provided by the system to the user.

A data window 804 may also be included in the mobile computing device user interface display 800. The data window 804 illustrated in FIG. 8 shows graphical representations of information provided by the system to the user and three adjustable inputs or variables that can be manipulated by the user 110 to visualize changes to the graphical representation of information within the data window 804.

Finally, a user input window 806 may be provided to allow the user to provide typed, written, or audible input, such that the use can interact with the system via the portal. In some embodiments, this input may comprise a request, including request parameters. Additionally or alternatively, the user input may comprise additional responses to system prompts or questions, clarifications, user authentication information, or the like.

Of course, the sample displays 700 and 800 in FIGS. 7A, 7B, and 8 are examples, and additional or alternative windows may be included, windows may in different arrangements, sizes, numbers, and the like.

As will be appreciated by one of skill in the art, the present invention may be embodied as a method (including, for example, a computer-implemented process, a business process, and/or any other process), apparatus (including, for example, a system, machine, device, computer program product, and/or the like), or a combination of the foregoing. Accordingly, embodiments of the present invention may take the form of an entirely hardware embodiment, an entirely software embodiment (including firmware, resident software, micro-code, and the like), or an embodiment combining software and hardware aspects that may generally be referred to herein as a "system." Furthermore, embodiments of the present invention may take the form of a computer program product on a computer-readable medium having computer-executable program code embodied in the medium.

Any suitable transitory or non-transitory computer readable medium may be utilized. The computer readable medium may be, for example but not limited to, an electronic, magnetic, optical, electromagnetic, infrared, or semiconductor system, apparatus, or device. More specific examples of the computer readable medium include, but are not limited to, the following: an electrical connection having one or more wires; a tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device.

In the context of this document, a computer readable medium may be any medium that can contain, store, communicate, or transport the program for use by or in connection with the instruction execution system, apparatus, or device. The computer usable program code may be transmitted using any appropriate medium, including but not limited to the Internet, wireline, optical fiber cable, radio frequency (RF) signals, or other mediums.

Computer-executable program code for carrying out operations of embodiments of the present invention may be written in an object oriented, scripted or unscripted programming language such as Java, Perl, Smalltalk, C++, or the like. However, the computer program code for carrying out operations of embodiments of the present invention may also be written in conventional procedural programming languages, such as the "C" programming language or similar programming languages.

Embodiments of the present invention are described above with reference to flowchart illustrations and/or block diagrams of methods, apparatus (systems), and computer program products. It will be understood that each block of the flowchart illustrations and/or block diagrams, and/or combinations of blocks in the flowchart illustrations and/or block diagrams, can be implemented by computer-executable program code portions. These computer-executable program code portions may be provided to a processor of a general purpose computer, special purpose computer, or other programmable data processing apparatus to produce a particular machine, such that the code portions, which execute via the processor of the computer or other programmable data processing apparatus, create mechanisms for implementing the functions/acts specified in the flowchart and/or block diagram block or blocks.

These computer-executable program code portions may also be stored in a computer-readable memory that can direct a computer or other programmable data processing apparatus to function in a particular manner, such that the code portions stored in the computer readable memory produce an article of manufacture including instruction mechanisms which implement the function/act specified in the flowchart and/or block diagram block(s).

The computer-executable program code may also be loaded onto a computer or other programmable data processing apparatus to cause a series of operational steps to be performed on the computer or other programmable apparatus to produce a computer-implemented process such that the code portions which execute on the computer or other programmable apparatus provide steps for implementing the functions/acts specified in the flowchart and/or block diagram block(s). Alternatively, computer program implemented steps or acts may be combined with operator or human implemented steps or acts in order to carry out an embodiment of the invention.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

Embodiments of the present invention are described above with reference to flowcharts and/or block diagrams. It will be understood that steps of the processes described herein may be performed in orders different than those illustrated in the flowcharts. In other words, the processes represented by the blocks of a flowchart may, in some embodiments, be in performed in an order other that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

The invention claimed is:

1. A system for execution of consolidated resource-based actions, the system comprising:
   a memory device; and
   a processing device operatively coupled to the memory device, wherein the processing device is configured to execute computer-readable program code to:
   monitor a plurality of disparate databases;
   receive a request from a computing device of a user, wherein the received request comprises request parameters, wherein the request parameters comprise at least the scope of the request, the boundaries of the request, the desired output, and time-based information;
   identify relevant data from the plurality of disparate databases based on the request parameters;
   aggregate the relevant data from the plurality of disparate databases into a consolidated resource database;
   initiate an artificial intelligence engine on the aggregated relevant data stored in the consolidated resource database;
   determine, using the artificial intelligence engine, a responsive action based on the aggregated relevant data retrieved from the consolidated resource database and the request parameters;
   in response to determining the responsive action, execute the responsive action, wherein executing the responsive action comprises at least causing a user interface of the computing device of the user to communicate a response to the received request.

2. The system of claim 1, wherein monitoring the plurality of disparate databases comprises continuously monitoring a plurality of databases associated with a plurality of disparate systems of record.

3. The system of claim 1, wherein the processing device is further configured to execute computer-readable program code to:
   aggregate data from the plurality of disparate databases into a consolidated resource database; and
   identify the relevant data from the consolidated resource database based on the request parameters.

4. The system of claim 1, wherein the processing device is further configured to execute computer-readable program code to:
   provide an online portal to the computing device of the user;
   receive the request from the computing device of the user via the online portal; and
   cause the user interface of the computing device of the user to communicate the response to the received request via the online portal.

5. The system of claim 1, wherein determining the responsive action based on the relevant data and the request parameters comprises transmitting the relevant data and the request parameters to the artificial intelligence engine configured to determine responsive actions, and receiving an output of the responsive action from the artificial intelligence engine.

6. The system of claim 1, wherein the received request comprises a command to adjust an authorization level of an individual to interact with a financial account associated with the user; and
wherein executing the responsive action comprises adjusting the authorization level of the individual to interact with the financial account associated with the user and transmitting a notification message confirming the adjusting to the computing device of the user.

7. The system of claim 1, wherein the received request comprises a command to provide a model of a future financial status of an entity associated with the user;
wherein determining the responsive action based on the relevant data and the parameters comprises generating the model of the future financial status of the entity; and
wherein executing the responsive action further comprises displaying the model of the future financial status of the entity on the computing device of the user along with one or more adjustable variables that are configured to adjust one or more inputs to the model of the future financial status of the entity.

8. A computer program product for execution of consolidated resource-based actions, the computer program product comprising at least one non-transitory computer readable medium comprising computer readable instructions, the instructions comprising instructions for:
monitoring a plurality of disparate databases;
receiving a request from a computing device of a user, wherein the received request comprises request parameters, wherein the request parameters comprise at least the scope of the request, the boundaries of the request, the desired output, and time-based information;
identifying relevant data from the plurality of disparate databases based on the request parameters;
aggregating the relevant data from the plurality of disparate databases into a consolidated resource database;
initiating an artificial intelligence engine on the aggregated relevant data stored in the consolidated resource database;
determining, using the artificial intelligence engine, a responsive action based on the aggregated relevant data retrieved from the consolidated resource database and the request parameters;
in response to determining the responsive action, executing the responsive action, wherein executing the responsive action comprises at least causing a user interface of the computing device of the user to communicate a response to the received request.

9. The computer program product of claim 8, wherein monitoring the plurality of disparate databases comprises continuously monitoring a plurality of databases associated with a plurality of disparate systems of record.

10. The computer program product of claim 8, wherein the computer readable instructions further comprise instructions for:
aggregating data from the plurality of disparate databases into a consolidated resource database; and
identifying the relevant data from the consolidated resource database based on the request parameters.

11. The computer program product of claim 8, wherein the computer readable instructions further comprise instructions for:
providing an online portal to the computing device of the user;
receiving the request from the computing device of the user via the online portal; and
causing the user interface of the computing device of the user to communicate the response to the received request via the online portal.

12. The computer program product of claim 8, wherein determining the responsive action based on the relevant data and the request parameters comprises transmitting the relevant data and the request parameters to the artificial intelligence engine configured to determine responsive actions, and receiving an output of the responsive action from the artificial intelligence engine.

13. The computer program product of claim 8, wherein the received request comprises a command to adjust an authorization level of an individual to interact with a financial account associated with the user; and
wherein executing the responsive action comprises adjusting the authorization level of the individual to interact with the financial account associated with the user and transmitting a notification message confirming the adjusting to the computing device of the user.

14. The computer program product of claim 8, wherein the received request comprises a command to provide a model of a future financial status of an entity associated with the user;
wherein determining the responsive action based on the relevant data and the parameters comprises generating the model of the future financial status of the entity; and
wherein executing the responsive action further comprises displaying the model of the future financial status of the entity on the computing device of the user along with one or more adjustable variables that are configured to adjust one or more inputs to the model of the future financial status of the entity.

15. A computer implemented method for execution of consolidated resource-based actions, said computer implemented method comprising:
providing a computing system comprising a computer processing device and a non-transitory computer readable medium, where the computer readable medium comprises configured computer program instruction code, such that when said instruction code is operated by said computer processing device, said computer processing device performs the following operations:
monitoring a plurality of disparate databases;
receiving a request from a computing device of a user, wherein the received request comprises request parameters, wherein the request parameters comprise at least the scope of the request, the boundaries of the request, the desired output, and time-based information;
identifying relevant data from the plurality of disparate databases based on the request parameters;
aggregating the relevant data from the plurality of disparate databases into a consolidated resource database;
initiating an artificial intelligence engine on the aggregated relevant data stored in the consolidated resource database;
determining, using the artificial intelligence engine, a responsive action based on the aggregated relevant data retrieved from the consolidated resource database and the request parameters;

in response to determining the responsive action, executing the responsive action, wherein executing the responsive action comprises at least causing a user interface of the computing device of the user to communicate a response to the received request.

16. The computer implemented method of claim 15, wherein monitoring the plurality of disparate databases comprises continuously monitoring a plurality of databases associated with a plurality of disparate systems of record.

17. The computer implemented method of claim 15, further comprising:

aggregating data from the plurality of disparate databases into a consolidated resource database; and identifying the relevant data from the consolidated resource database based on the request parameters.

18. The computer implemented method of claim 15, further comprising:

providing an online portal to the computing device of the user;

receiving the request from the computing device of the user via the online portal; and causing the user interface of the computing device of the user to communicate the response to the received request via the online portal.

19. The computer implemented method of claim 15, wherein determining the responsive action based on the relevant data and the request parameters comprises transmitting the relevant data and the request parameters to the artificial intelligence engine configured to determine responsive actions, and receiving an output of the responsive action from the artificial intelligence engine.

20. The computer implemented method of claim 15, wherein the received request comprises a command to adjust an authorization level of an individual to interact with a financial account associated with the user; and wherein executing the responsive action comprises adjusting the authorization level of the individual to interact with the financial account associated with the user and transmitting a notification message confirming the adjusting to the computing device of the user.

* * * * *